United States Patent [19]
Krupa, Jr. et al.

[11] Patent Number: 6,044,964
[45] Date of Patent: Apr. 4, 2000

[54] MULTIDIRECTION BELT CONVEYOR

[75] Inventors: Leonard Krupa, Jr.; Brian M. Keilly, both of Terre Haute, Ind.

[73] Assignees: Sony Corporation, Tokyo, Japan; Digital Audio Disc Corporation, Terry Haute, Ind.

[21] Appl. No.: 09/031,158

[22] Filed: Feb. 26, 1998

[51] Int. Cl.[7] .......................... B65G 17/12; B65G 25/00; B65G 47/10

[52] U.S. Cl. ................ 198/794; 198/803.12; 198/810.01

[58] Field of Search .......................... 198/803.12, 810.01, 198/794

[56] References Cited

U.S. PATENT DOCUMENTS

| | | | |
|---|---|---|---|
| 4,706,801 | 11/1987 | Vessey | 198/781 X |
| 4,731,567 | 3/1988 | Dands et al. | 318/594 X |
| 4,747,482 | 5/1988 | Sanno | 198/802.01 |
| 4,753,336 | 6/1988 | Taylor et al. | 198/560 X |
| 4,927,002 | 5/1990 | Springman | 198/487.1 X |
| 5,176,245 | 1/1993 | Sekitani | 198/465.2 X |

OTHER PUBLICATIONS

Catalog Page for SUNX Sensors, p. 181, (no date).
Catalog Page for Ball Bearings, (no page No. or date).
McMaster–Carr Catalog, pp. 2329, 2331,2332, (no date).
Brecoflex Catalog, pp. 11–13, (no date).
Brecoflex Catalog Page for Slider Beds, (no page No. or date).
Catalog Page for Torque Limiter, p. 14, (no date).

*Primary Examiner*—Christopher P. Ellis
*Assistant Examiner*—Kenneth W Bower
*Attorney, Agent, or Firm*—Wood, Herron & Evans, L.L.P.

[57] ABSTRACT

A multidirectional belt-type conveyor includes a base supporting a motor-driven conveyor belt formed in a continuous closed loop and supporting articles to be conveyed. The conveyor belt is mounted on the base such that the closed loop forms the multidirectional path in a generally horizontal direction, thereby permitting the conveyor belt to convey the articles along the multidirectional path.

12 Claims, 5 Drawing Sheets

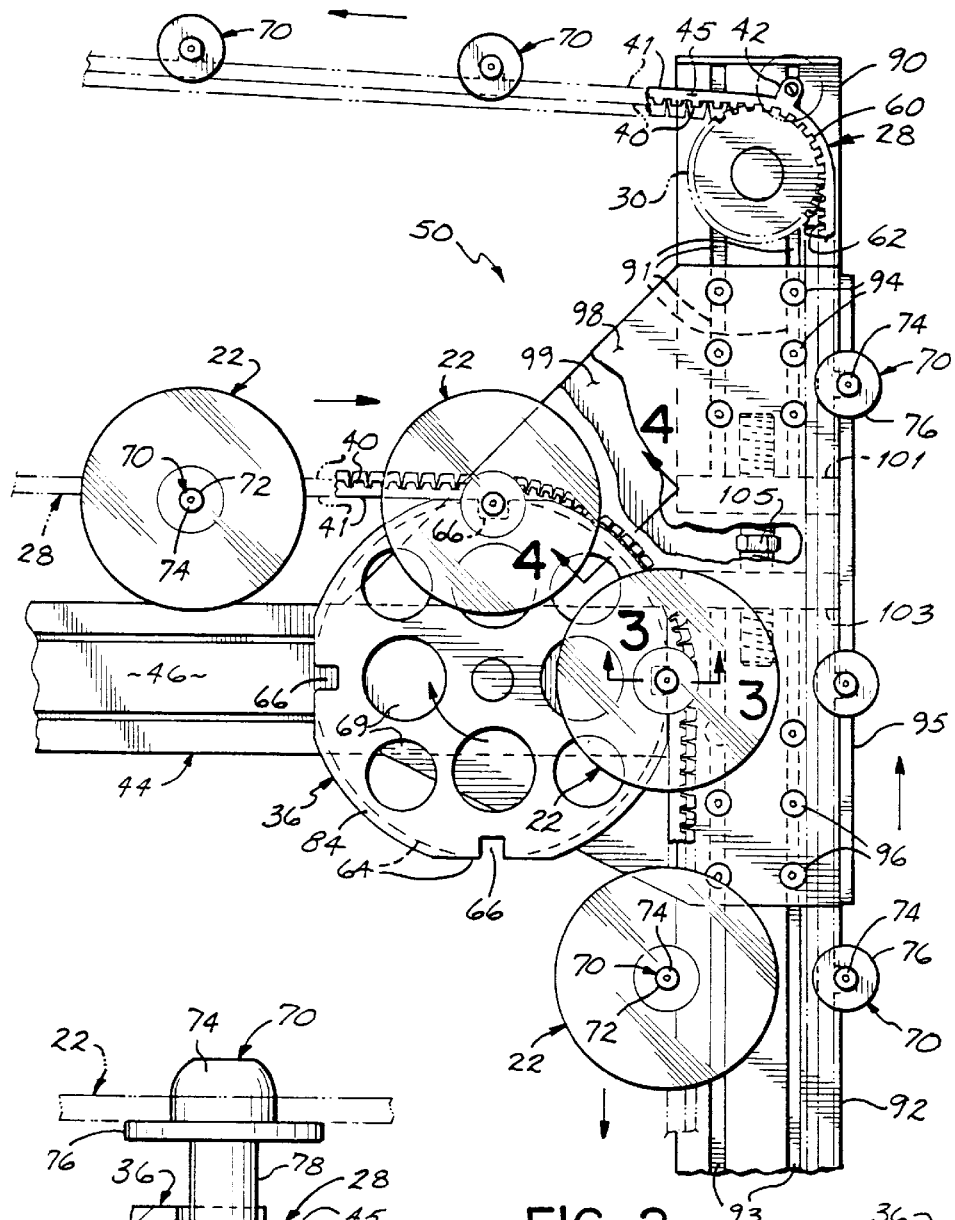
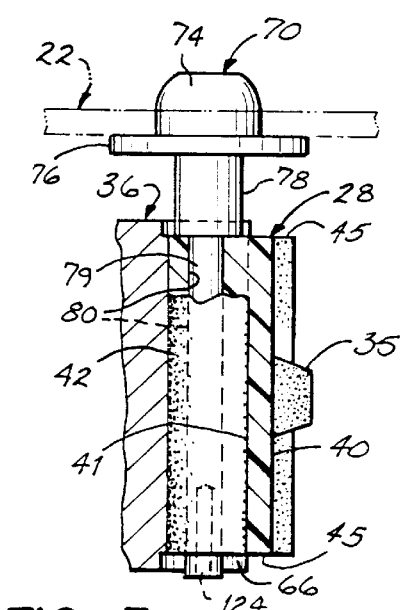
FIG. 3
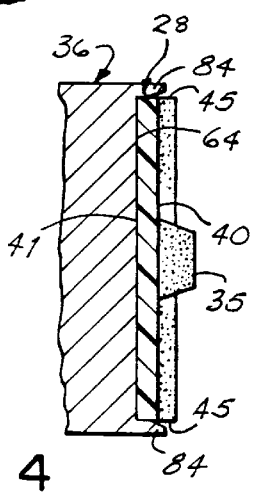
FIG. 4
FIG. 2

MULTIDIRECTION BELT CONVEYOR

BACKGROUND OF THE INVENTION

This invention relates to material handling and more particularly, to conveyors. Ongoing efforts to increase the efficiency and output of production operations have resulted in a continuing focus on how materials are moved with respect to machines and other process operations being performed. Often materials are moved on conveyors between the load and unload stations of machines or other process stations, and preferably, the conveyors extend in a straight line path between the load and unload stations. However, as will be appreciated, floor space and floor layout considerations do not always permit such convenient conveyor routing; and instead, conveyor paths are designed to transport workpieces in multiple directions, for example, mutually perpendicular directions. Powered belt-type conveyors utilize generally horizontal flat belts, and such belts are not readily routed around corners. Therefore, a multidirectional belt-type conveyor path is comprised of multiple powered conveyor belts which are abutted end-to-end and oriented to move in the desired different directions. In some applications, items may be dropped from the discharge end of one conveyor moving in a first direction onto a load end of a second conveyor moving in the different direction. However, in other applications, a third material handling device, for example, a pick-and-place robot may be used to move the items from one conveyor to the other. As will be appreciated, a multidirectional belt-type conveyor system requires multiple belts, multiple belt drive motors and various sensors verifying the transfer of an item onto and off of the conveyor. In addition, if a pick-and-place robot is used, there is substantial additional cost in the application of the robot. For example, such a robot may add a motor, two cylinders, up to ten sensors and a cycle control to the overall conveyor system. Further, as the number of devices, motors and sensors increase, the conveyor system costs proportionally increase and the system reliability proportionally decreases.

Generally, the operation of a conveyor system is synchronized with the operation of a machine at a conveyor load station, and often the operation of the conveyor system is noncontinuous and incremental to match the processing of discrete workpieces by the machine. To coordinate the operation of multiple conveyors and interconnecting robots to match the desired incremental operation of an associated machine is also complex and expensive to implement. Such complex conveyor systems have another disadvantage in that they are often physically large since they are serially connected stand-alone units. The large size consumes significant valuable floor space and often impedes access to areas of a machine requiring maintenance or other periodic attention.

Consequently, there is a need for a material handling system that does not have the limitations and disadvantages of known conveyor systems for moving materials in different directions. There is a need for a multidirectional conveyor system that is simpler, less complex, less expensive and more reliable than conventional multidirectional conveyor designs.

SUMMARY OF THE INVENTION

The present invention provides a simple, compact, less expensive and more reliable continuous, multidirectional belt-type conveyor that may be used to interconnect machines and processing operations. The multidirectional belt-type conveyor is especially useful for those applications in which floor space is at a premium, and it is desired to minimize the area consumed by the conveying elements.

According to the principles of the present invention and in accordance with the preferred embodiments, the multidirectional belt-type conveyor includes a base and a motor-driven conveyor belt formed in a continuous closed loop and supporting articles to be conveyed. The conveyor belt is mounted on the base such that the closed loop forms the multidirectional path in the generally horizontal direction, thereby permitting the conveyor belt to convey the articles along the multidirectional path.

In one aspect of the invention, first pulleys are rotatably mounted to the base and engage the inner side of the conveying element at opposite ends of the loop. An outer corner pulley is rotatably mounted to the base and engages the inner side of the conveyor belt at a first point intermediate the ends of the loop; an inner corner pulley is rotatably mounted to the base and engages the opposite side of the conveyor belt at a second point intermediate the ends of the loop. Thus, the conveyor belt bends around the inner and outer corner pulleys to provide article conveying paths in at least two directions in a generally horizontal plane.

In a further aspect of the invention, the conveyor belt may be moved through precise increments by using a sensor detecting a feature on the conveying belt to control the positioning of the conveyor belt with respect to adjacent equipment.

Thus, the present invention provides a simple, inexpensive, multidirectional belt-type conveyor system that may be routed in different directions by simply adding two pulleys. Further, the whole multidirectional conveying system is driven using only one belt drive motor. Thus, there are very few restrictions and cost penalties in designing a multidirectional conveying system, and machines may be located and oriented to optimize the process with less concern about the conveying system than in the past. Further, the conveying system may be economically designed to be longer so that a workpiece is processed on the conveyor, for example, to providing a drying time.

The conveyor system may be operated continuously or periodically to provide either continuous or incremental motion, respectively, to match the requirements of the process. Since there is only a single belt drive motor, there is no need to coordinate the operation of a plurality of motors or other material handling devices. Thus with a minimum of motors and sensors, the conveyor system of the present invention is relatively low in cost and very high in reliability.

These and other objects and advantages of the present invention will become more readily apparent during the following detailed description taken in conjunction with the drawings herein.

BRIEF DESCRIPTION OF THE DRAWINGS

FIG. 2 is a top layout view illustrating a corner of the conveyor system of the present invention.

FIG. 3 is a cross sectional view taken along line 3—3 of FIG. 2 illustrating the interface of a conveyor spindle with an inner corner pulley.

FIG. 4 is a cross section view taken along line 4—4 of FIG. 2 illustrating the interface between the conveyor belt and the internal corner pulley.

DETAIL DESCRIPTION OF THE INVENTION

Figure 1:
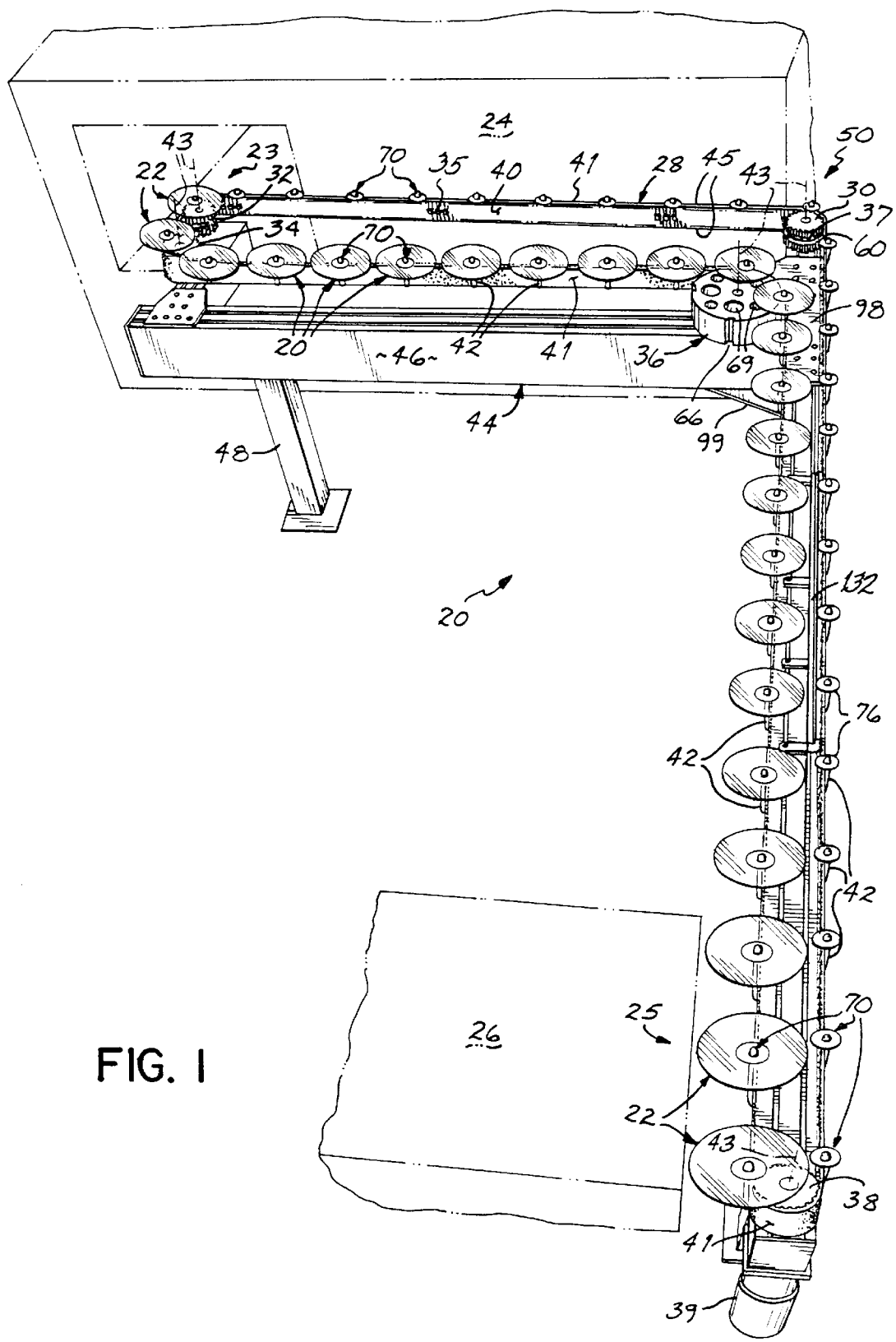
FIG. 1 is a perspective view of a belt-type conveyor in accordance with the principles of the present invention.

FIG. 1 illustrates a belt-type conveyor system 20 for conveying items or workpieces 22 from a load end 23 of the conveyor system 20 adjacent a first machine or processing station 24 to an unload end 25 adjacent a second machine or processing station 26. The conveyor system 20 utilizes a conveyor belt 28 formed in a continuous closed loop and having an inner side 40 which is drivingly engaged with idler belt guides or pulleys 30, 32, 34, 36 and a drive pulley 38. The inner side 40 normally has a toothed surface that engages toothed pulleys 30, 32, 34 and 38 and a parallel outer surface 41. The inner side 40 further includes a longitudinally extending, centrally located rib 35 that engages circumferential slots 37 in pulleys 30, 32, 34 and 38 (FIGS. 1 and 8) to keep the belt 28 located on the pulleys 30, 32, 34, 38. The surfaces 40, 41 are spaced apart by the thickness of the belt. The drive pulley or belt guide 38 is connected to an output shaft of a motor 39. Attached at fixed intervals on the outer surface of the conveyor belt are cylindrically shaped sleeves or lugs 42. The conveyor belt 28 and lugs 42 are made of polyurethane and may be purchased with the polyurethane sleeves 42 as model number 50 TK10/7680-V, W/2.3.2.012.012b from Breco-Flex Co., L.L.C. of Eatontown, N.J. Generally, the lugs 42 are attached to the belt by Breco-Flex Co. in accordance with a customer's specification. The idler pulleys 30, 32, 34 and drive pulley 38 are also commercially available from Breco-Flex Co. The idler pulleys 30–36 and drive pulley 38 are rotatably mounted in bearings (not shown) that in turn are mounted on a frame structure 44. The frame structure includes numerous horizontal members 46 which are connected together and mounted on top of several vertical support columns or legs 48 which support the conveyor system 20 at a desired elevation. The structural members of the frame 44 are normally made from extruded aluminum beams and associated fasteners which are commercially available from Item Products, Inc. of Livonia Mich.

It should be noted that, as the conveyor belt 28 and idler pulleys 30–34 are provided by the supplier, the looped configuration of the conveyor belt 28 is normally rotated 90° from the orientation illustrated in FIG. 1. In other words, the outer side or surface 41 of the belt 28 is normally directed upwards in a horizontal plane, and the axes of rotation 43 of the idler pulleys 30, 32 are likewise oriented horizontally. In addition, an edge of the looped belt defines a curved or looped path in a generally vertical plane. Further, the workpieces being transported by the belt 28 are normally carried on and supported by the outer surface 41. As will be appreciated, such a looped conveyor belt normally extends linearly between the load and unload stations for the conveyor. Further, to move work pieces in two different directions as illustrated in FIG. 1, two independently operating conveyor belt systems are normally used in which work pieces are carried on the outer conveyor belt surface 41 from the conveyor input or load end to the conveyor discharge or unload end. At the conveyor discharge, the workpiece may be literally dropped onto the load end of a second conveyor extending in the second direction; or, alternatively, a robot or other material handling mechanism is used to unload work pieces form the first conveyor and load those workpieces on the second conveyor. Consequently, as normally installed, to transport workpieces in two directions with a belt-type conveyor, requires two complete conveyor systems including all of the necessary sensors and motors as well as an interconnecting material handling system which requires its own motors and sensors. In addition, a complex control system must be utilized in order to synchronize the operation of the two conveyors and material handler.

As will be appreciated, the conveyor system 20 of FIG. 1 permits work pieces to be moved in two different linear directions utilizing only a single conveyor belt 28, a single motor 39 and drive pulley 38 and standard idling pulleys 32, 34. The axes of rotation 43 are oriented generally vertically, and thus, a lateral edge 45 of the looped conveyor belt 28 moves through a curved or looped path that is in a generally horizontal plane. To move the work pieces around a corner 50, the belt-type conveyor 20 simply adds two additional idler pulleys 30, 36. Further, the conveyor system 20 can be designed to move in any other direction by simply inserting either one or a pair of vertically oriented idler pulleys similar to the pulleys 30, 36 at the corner where it is desired to change the direction of conveyor motion. Thus, by mounting the conveyor belt 28 such that the sides 40, 41 and axes of rotation 43 of the idler pulleys 30, 36 are generally vertical, the conveyor belt 28 may be curved and flexed along any desired conveying path of motion while still using only a single conveyor drive motor.

The conveyor corner 50 is illustrated in greater detail in FIG. 2. The corner 50 imposes the unique requirement that the conveyor belt 28 be simultaneously guided on its toothed inner surface 40 and its outer surface 41. The commercially available toothed outer corner pulley 30 has a circumferential toothed configuration 60 that interlocks and meshes with the toothed configuration 62 on the inner side or surface 40 of the belt 28. Similarly, the outer circumference 64 of the inner corner pulley 36 must be in contact and interface with the outer side or surface 41 of the belt 28. Consequently, the pulley 36 must contain cutouts or notches 66 that are sized and shaped to receive the lugs 42 on the outer surface 41 of the belt 28. The inner corner pulley 36 must have a diameter that avoids interference between the work pieces 22 as they are moved around the corner. It is also preferable that one of the lugs 42 always be engaged with one of the slots 66 so that the belt 28 and the pulley 36 always move in unison. The corner pulley 36 is normally manufactured from aluminum and has a pattern of bores 69 for weight reduction.

Referring to FIG. 3, the work pieces 22 are supported on the belt by means of a multi-diameter shaft or spindle 70. During the loading process, an opening or hole 72 in the work piece 22 receives the head 74 of the spindle which is rounded to help locate the hole 72 concentrically about the spindle 70. A larger diameter plate 76 is fixed to the spindle 70 beneath the head 74 and supports the work piece 22. The spindle 70 has a shaft 78 immediately below the plate 76 that is sized to form a shoulder against the lug 42. A lower shaft 79 is sized to fit within a bore 80 within the lug 42. The pulley 36 is configured such that it does not contact the spindle 70. Further, as illustrated in FIG. 4, the outer circumferential surface 64 is bounded at its top and bottom by upper and lower flanges 84 which help maintain the belt 28 on the pulley 36. A Teflon coating may be applied to the outer surface 64 and the slots 66 of pulley 36 to facilitate relative motion between the pulley 36 and the belt 28.

For optimal operation, most belt drive systems require that the belt be mounted about the pulleys with a certain tension force in the belt. Normally, that tension force is measured by measuring the deflection of the belt between two pulleys in response to a predetermined force applied normally to the surface 41 of the belt 28. The distance between pulleys is then adjusted until the desired tension is achieved. Referring to FIG. 2, the outer corner pulley 30 is mounted on a frame portion 90 that is adjustably attached to frame portion 92. Sets of fasteners 94, 96 are used to rigidly connect an upper plate 98 to the respective frame portions 90, 92. The frame portions 90, 92 have respective T-slots 91, 93 which receive nuts (not shown) for the fasteners 94, 96. A lower plate 99 is similarly bolted to the frame portions 90, 92 by other sets of fasteners (not shown). A side plate 95 is also bolted to both of the frame portions 90, 92 to provide further stability and support. A first jack plate 101 having threads, for example, right hand threads, is attached to one end of the frame portion 90. A second jack plate 103 is attached to the second frame portion 92 opposite the jack plate 101. The jack plate 103 has a bore with opposite threads, for example, left hand threads. A belt tension adjusting jack screw 105 is threadedly coupled to the jack plates 101, 103 such that rotation of the adjustment screw in one direction pushes the jack plates 101, 103 apart, and rotation of the jack screw 105 in the opposite direction pulls the jack plates 101, 103 together.

To adjust the tension of the conveyor belt 28, the fasteners 94, 96 securing the plates 95, 98, 99 to the first frame portion 90 are loosened. If it is desired to increase the tension force in the belt 28, the jack screw 105 is rotated in a direction separating the jack plates 101,103, thereby moving the first frame section 90 away from the second frame section 92. That motion increases the distance between the idler pulley 30 and the drive pulley 38 thereby increasing the tension force on the belt 28. If it is desired to reduce the tension force on the belt, the jack screw 105 is rotated in the opposite direction. When the desired tension force is achieved, the fasteners 94, 96 holding the upper and lower plates 98, 99 to the first frame portion 90 are tightened thereby securing the first and second frame portions 90, 92 to form a unitary frame structure. Referring to FIG. 1, it should be noted that adjusting the belt tension by changing the position of the outer corner pulley 30 has the advantage of changing the length of the conveyor system 20 without changing the position of the load and unload ends 23, 25 with respect to the processing stations 24, 26, respectively.

As will be appreciated, the flexible multidirectional conveyor system of FIG. 1 has many potential applications in which such a conveyor system substantially reduces the cost of and increases the reliability of moving work pieces from a first processing machine or station 24 to a second machine or processing station 26. In one example, a machine 24 may be a molding machine which is producing, with each molding cycle, a pair of compact discs 22 which are loaded as a pair on the conveyor system 20, and moved to a discharge end 25 of the conveyor system 20, where the pair of discs are removed to be processed by the second processing station 26. The flexibility of the multidirectional conveyor system has the additional advantage in that the conveyance of the discs by the conveyor can facilitate the process. For example, the period of time that the discs are on the conveyor system 20 may be utilized to cool the discs after the molding process. The ability to provide a corner in the conveyor travel lengthens the conveyor, thereby providing a longer process cooling time for the discs. Further, such a lengthening of the conveyor does not require a greater distance between the processing stations 24, 26 and, therefore, does not compromise the efficient use of manufacturing floor area.

Figure 5:
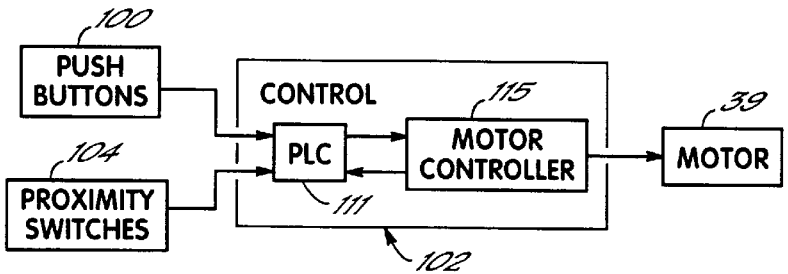
FIG. 5 is a schematic block diagram illustrating a control system for the belt-type conveyor system of the present invention.

The control for operating the conveyor is illustrated schematically in FIG. 5. Various push buttons 100, for example, start and stop push buttons, provide input signals to a control 102 which includes a cycle control 111, for example, a programmable logic controller. The cycle control 111 is normally used to control various devices within the overall system and interface with other controls for associated machines, loaders, etc. Other inputs to the control 102 are provided by switches 104, for example, sensors, associated with the conveyor or devices for loading and unloading the conveyor. At appropriate times, the cycle control 111 provides inputs to a motor control 115 as to the status of load/unload devices and a command to initiate a conveyor index cycle. The motor control 115, through its inputs and outputs, exclusively controls the conveyor operation. In response to a conveyor index command from the cycle control 111, the motor control 115 provides commands to run and stop the motor 39 with a desired and programmable respective acceleration and deceleration. In addition, as appropriate, the motor control 115 initiates a conveyor positioning cycle in which the conveyor position is controlled as a function of a conveyor position feedback signal. The motor control 115 then provides signals to the cycle control 111 indicating either a successful conveyor belt indexing cycle or an indexing cycle fault condition. The motor control 115 and motor 39 are commercially available as a CompuMotor indexer drive and stepper motor, part number SX83-135, from Process Automation Devices, Inc. of Indianapolis, Ind.; and the programmable logic controller 111 is commercially available as a Sharp JW-70 from Ohio Takamatsu Electric of Dublin, Ohio. As will be appreciated, there are many different commercially available devices that may be used to provide the functions of the control 102.

Figure 6:
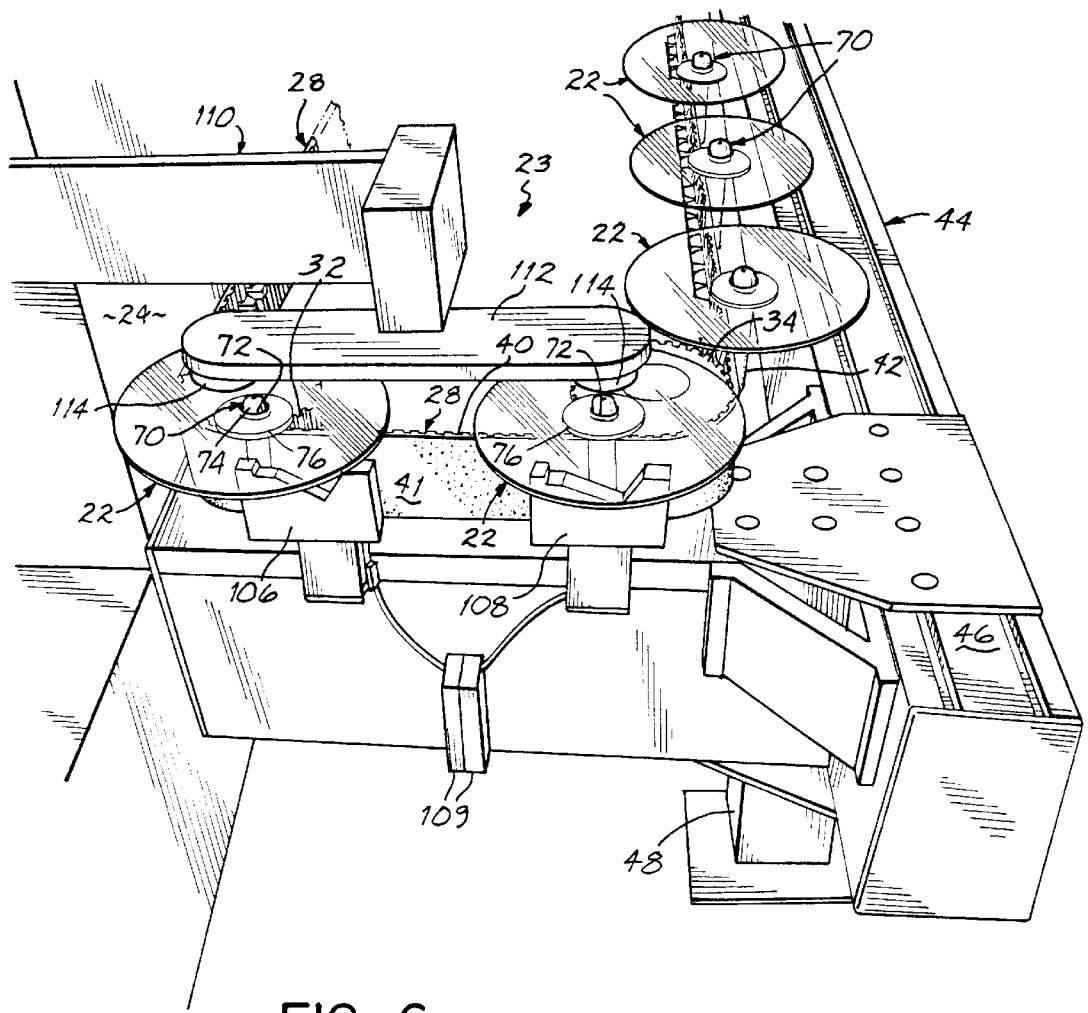
FIG. 6 is a perspective view of one end of the conveyor operating with a typical load/unload station.

Referring to FIG. 6, by means to be subsequently described, the conveyor belt 28 is moved to place the spindles 70 at a desired position to receive discs 22 which have just been removed from the molding machine 24. The discs are being manipulated by a reciprocating arm 110 of a robot, for example, a pick and place robot. An end effector 112 is mounted to the end of the reciprocating arm 110 and has vacuum controlled chucks 114 that releasably hold the discs 22. By well known control means, the reciprocating arm 110 lowers the end effector 112 such that the discs 22 are located concentrically with respect to the spindle heads 74 and lowered onto the support plates 76. Thereafter, the vacuum on the vacuum chucks 114 is released, and the discs 22 are supported exclusively by the support plates 76. While discs are being loaded on the stationary conveyor at the loading station 23 by means of the process just described, simultaneously discs 22 are being unloaded from the unload end 25 of the conveyor for processing by the station 26 (FIG. 1). The discs 22 are unloaded a pair at a time by a device that is similar in operation to the reciprocating arm 110 and end effector 112 but designed to be compatible with the processing of the discs by the processing station 26.

Figure 7:
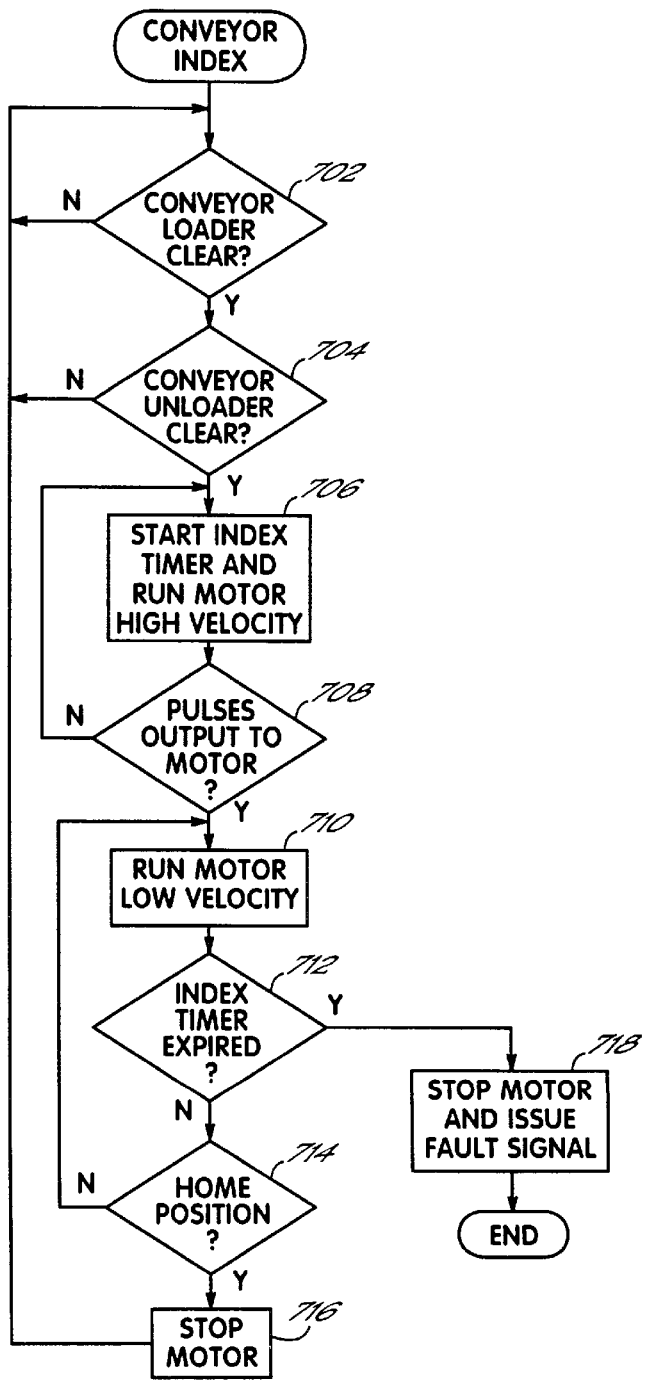
FIG. 7 is a flow chart illustrating typical cycle of operation of the belt-type conveyor.

The operation of the conveyor system 20 by the control 102 (FIG. 5) is generally illustrated by the flow chart of FIG. 7. Before conveyor motion can be initiated, the control 102 must make sure that the conveyor loader and conveyor unloader are clear. For example, in process step 702 of FIG. 7, the control of 102 logically determines that at least one of the sensors 106,108 (FIG. 6) detects the presence of one of the discs 22. The sensors 106, 108 are powered by respective amplifiers 109. The sensors 106,108 are commercially available as SunX photoelectric fixed distance sensors, part number SH-72, from Allied Automation of Indianapolis, Ind. The amplifiers 109 are commercially available as SunX part number SU-7. The control 102 also determines whether the reciprocating arm has been retracted to a clear position which position may be detected by a limit switch or other sensor (not shown).

The unload station has a pair of sensors and amplifiers identical to the sensors 106 and 108 (FIG. 6) and amplifiers 109 for detecting that one or a pair of discs 22 have been removed from respective spindles 70 at the unload station 25. Therefore, the control 102 at process step 704 of FIG. 7 detects that at the unload station, the spindles are unloaded and the unload retractor arm is clear of the conveyor. If the load and unload cycles are successfully completed, the control at 706 initiates the operation of an index timer. The purpose of the index timer is to terminate the positioning process if the conveyor belt does not move to the desired spindle position within a predetermined period of time as measured by the index timer.

Simultaneously with starting the index timer, the control 102 at 706 of FIG. 7 commands the motor 39 (FIG. 1) to run at a high velocity which rapidly moves the conveyor belt 38 and the discs 22 in a direction from the load station 23 toward the unload station 25. However, since the described application is processing two discs at a time, the increment of conveyor motion must be limited to a displacement equal to the distance between three of the spindles, that is, a distance such that the next pair of empty spindles is accurately located at the load station 23. As will be appreciated, reliably and precisely positioning the spindles 70 on the belt 28 with each indexing motion of the belt 28 over a long period of time is extremely important. Further, the belt 28 is subject to thermal expansion and contraction as well as potentially stretching over time. Further, any errors that arise in the control system will, in the absence of a feedback system, be cumulative over time. Therefore, it is preferable that a position feedback be provided to the control 102. Further, the inherent indexing motion of the belt requires that acceleration and deceleration be reliably controlled.

The acceleration of the motor 39 from rest to its high velocity is user adjustable and is empirically determined by observing the effects of acceleration on the discs 22 on the spindles 70. The deceleration and final positioning of the conveyor is implemented by a lower velocity motion to the final or home position with a feedback system detecting the presence of a spindle. Therefore, to implement the high velocity motion, the control 102 provides a predetermined number of step commands at a higher rate to the motor 39 that represent a desired distance to move the conveyor at a desired higher velocity prior to entering the lower speed homing or positioning cycle. Thus, when the control 102 detects at 708 of FIG. 7 that the desired number of high speed distance commands have been issued to the motor 39, the control 102 at process step 710 of FIG. 7 provides continuous step commands to the motor 39 at a lower rate. Thereafter, the control 102 at process step 712 checks whether the index timer has timed out; and if not, the control 102 at 714 of FIG. 7 detects whether one of the spindles 70 (FIG. 8) is at the desired home position.

Figure 8:
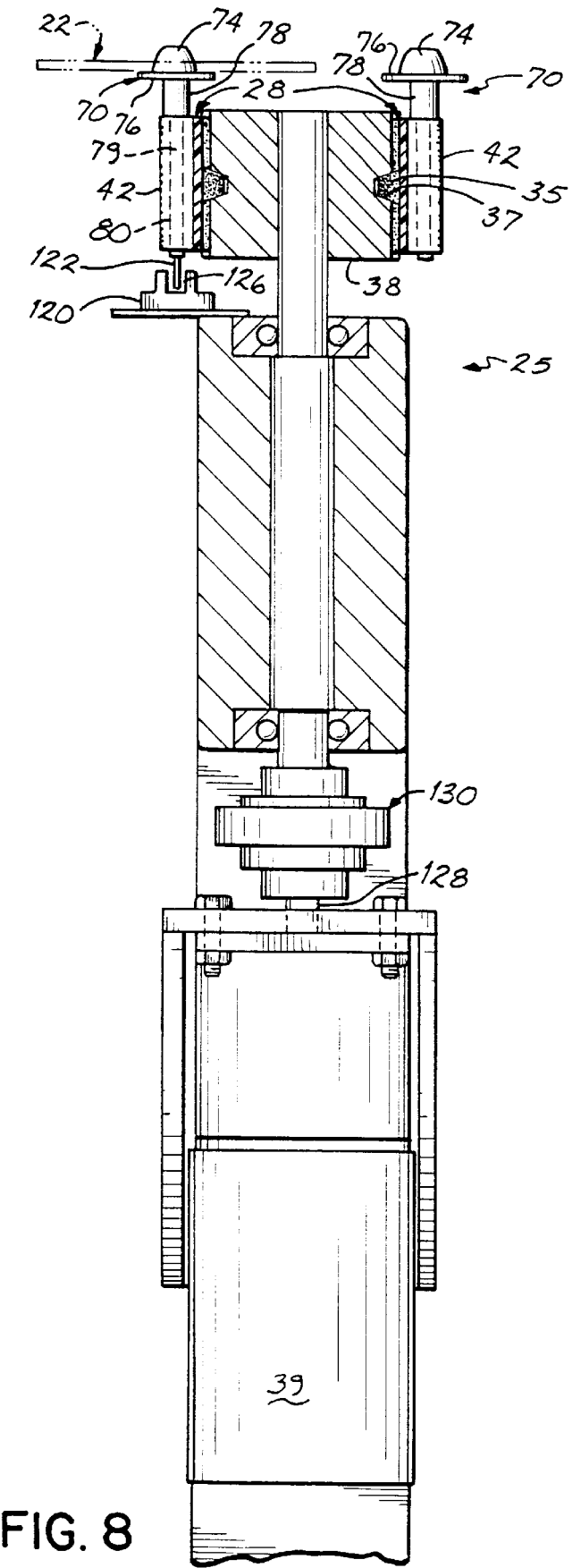
FIG. 8 is a partial cross sectional view illustrating the conveyor drive and indexing system.

Referring to FIG. 8, the home position is detected at the unload end 25 of the conveyor system 20 by a sensor 120 sensing a detectable feature on the conveyor belt, for example, by detecting the presence of a pin 122 extending from the bottom of the spindle 70. Each of the spindles 70 has a bore 124 (FIG. 3) sized to receive the pins 122. Pins 122 are inserted or pressed into a respective bore 124 in every other one of the spindles 70, so that there are half as many pins 122 as spindles 70. The sensor 120 is a commercially available through beam slot sensor, for example, part number PM-L53E-C1 from SunX. In the described application, each of the discs loaded onto the conveyor may be different, and in order to keep track of each disc in a pair, it is preferred that every other spindle have a pin 122. Thus, the number of pins utilized in a conveyor loop is a function of the application in which the conveyor is being used. As the pin 122 passes through the slot 126 of the sensor 120, the sensor 120 provides a signal to the control 102 indicating that the spindle 70 is at the home position. Immediately upon detecting the home position signal, the control 102 at process step 716 of FIG. 7 stops the motor 39. Until the home position is detected, the control 102 continues to monitor the index timer at process step 712; and if the timer times out, the control 102 at process step 718 stops the motor and issues a fault signal to the user.

Several fault conditions may cause the index timer to expire prior to a spindle achieving the home position, for example, one of the pins 122 may be missing from a spindle 70. In other situations, the driving engagement between the output motor shaft 128 (FIG. 8) and the belt 28 may fail. For example, a mechanical coupling connecting the drive shaft 128 with the drive pulley 38 may fail. Alternately, some mechanical interference within the conveyor system 20 may result in the conveyor belt 28 binding and presenting an increased torque load to the motor 39. In that situation, a torque limiter 130 connected between the motor shaft 128 and the driving pulley 38 will slip, thereby limiting the torque applied to the driving pulley 38 and stopping the conveyor belt 28. In other situations, broken wires or failed connections may prevent commands being provided by the control 102 from operating the motor 39.

With the conveyor 20 in its desired home position, newly molded discs 22 are loaded onto spindles 70 at the load end 23 of the conveyor 20, and simultaneously, discs 22 are removed from spindles 70 at the unload end 25 of the conveyor 20. When the loading and unloading cycles have successfully been completed, incremental conveyor motion is again executed by the control 102. The conveyor system 20 iterates through the above incremental motion throughout the production cycle.

In the above-described system, the discs are produced in pairs, loaded and unloaded in pairs. In some production runs, the discs in each pair of discs is different, however, that difference is not discernible by simple visual inspection. However, similarly made discs will always be transferred on the same spindles within the conveyor system. Therefore, the different discs can be identified by applying two different colors, for example, red and green, to the tops of alternate spindles 70. Therefore, half of the spindles 70 colored red will always have the disc from one mold of the molding machine 24, and the other alternate spindles 70 will always have the disc from the other mold of the molding machine 24.

Thus, the present invention provides a simple, inexpensive, multidirectional belt-type conveyor system that may be routed in different directions by simply adding two pulleys, that is, inner and outer corner pulleys. Further, the whole multidirectional conveying system is driven using only one belt drive motor. Since there is only a single belt drive motor, there is no need to coordinate the operation of a plurality of motors or other material handling devices. Thus with a minimum of motors and sensors, the conveyor system of the present invention is relatively low in cost and very high in reliability.

As will be appreciated, the ability of the conveyor system 20 to convey work pieces in multiple directions around corners for insignificant additional costs provides significant advantages. For example, by removing many restraints imposed by linear belt-type conveyor systems on the layout of processing stations, a process engineer has significantly more flexibility in designing a more efficient and economical processes. Further, the flexibility of multidirectional travel of a belt-type conveyor system permits the conveyor system to be integrated within the process. In addition, the ability to use a single belt-type conveyor to precisely move and position work pieces in multiple directions, thereby eliminating the need for multiple conveyors, not only provides a substantial cost advantage, but by eliminating numerous motors and sensors, the reliability of the conveying system is substantially enhanced.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, although not required, a guide rail 132 (FIG. 1) may be used to keep the conveyor belt quieter as it moves in the different directions. The guide rail tends to dampen vibrations in the belt which helps to dampen mechanically noise and vibrations in the conveyor belt and is also commercially available from Breco-Flex Co. Further, the external corners of the slots 66 may include a bearing to facilitate the lug 42 moving into and out of the slot 66. In the described embodiment, the control senses the position of the shaft 122 in order to define the home position. As will be appreciated, any other detectable feature associated with the conveyor belt may be used. For example, a sensor may be used to detect the individual teeth on the inner side of the conveyor belt. Alternatively, a visually detectable mark on the conveyor belt may be used.

The conveyor belt in the above described application is illustrated as a flexible flat belt 38 having opposed flat sides 40, 41 separated by a thickness of the belt, and the flat sides 40, 41 define a belt width between the edges 45 that is substantially greater than its thickness. Such a flat belt construction has the advantages of being structurally quite rigid when mounted in a vertical orientation as shown and described. In other words, the flat belt construction has less sag and twist as it moves over the long runs between the pulleys; and further, less belt tension is required to maintain the belt in a satisfactory state. However, flexible conveyor belts of other cross-sections and shapes may also be used as long as those belts have an edge moving in a curved or looped path in a generally horizontal plane. Further, while normally teeth are used to provide a driving engagement between the pulleys and the belt, the invention is operable using a friction drive or other driving engagement between the pulleys and the belt. Some belt slippage can be tolerated because the belt drive motor is controlled as a function of the detected position of the belt. However, the belt motor may also be controlled open loop in a known manner, or the motor may be controlled in response to detecting an increment of rotation of the motor or one or more of the pulleys.

In the described example, the looped conveyor belt is formed around five vertically oriented pulleys; however, fewer or more pulleys may be used depending on whether there is no corner, one corner or more corners of travel of the looped conveyor belt. With no corners, only two vertically oriented pulleys would be used, however, with one corner, the inner corner pulley 36 may not be used; and hence, only three vertically oriented pulleys are used to provide a generally triangular path of conveyor motion. Thus, any desired generally horizontal multidirectional path of conveyor motion may be constructed using a single drive motor.

In the described example, the home position cycle is implemented with every cycle of incremental motion; however, as will be appreciated, the home position cycle may be implemented fewer times, for example, only once per complete revolution of the conveyor belt. In that application, the motor 39 would be operated to move the conveyor belt through a number of cycles of incremental motion in an open loop mode, that is, with no position feedback, and a counter may be used to keep track of the number of incremental cycles between execution of the closed loop home positioning cycle described in steps 706–714 of FIG. 7. Further, the control 102 includes the cycle control 111 and motor control 115. The motor control 115, in other applications, may be connected to the push buttons 100 and switches 104, thereby providing a stand-alone control for the conveyor system 20.

Therefore, the invention in its broadest aspects is not limited to the specific details shown and described. Consequently, departures may be made from the details described herein without departing from the spirit and scope of the claims which follow.

What is claimed is:

1. An apparatus for conveying articles in at least two directions in a generally horizontal plane comprising:
    a base;
    a flexible flat conveyor belt formed in a continuous closed loop for supporting articles to be conveyed, the conveyor belt having an inner side with a toothed surface facing an interior of the closed loop and having an opposite outer flat side facing away from the interior of the closed loop, the conveyor belt being mounted with the inner and outer surfaces being disposed vertically;
    a first belt guide rotatably mounted to the base and engaging the toothed surface on the inner side of the conveyor belt at one end of the loop;
    a second belt guide rotatably mounted to the base and engaging the toothed surface on the inner side of the conveyor belt at an opposite end of the loop, the loop being formed by inner and outer conveyor belt portions moving in opposite directions with respect to each other;
    an outer corner belt guide rotatably mounted to the base and engaging the toothed surface of the inner side of the outer conveyor belt portion at a first point intermediate the ends of the loop, the outer conveyor belt portion bending around the outer corner belt guide to provide a first conveying path for the outer conveyor belt portion in two directions in a generally horizontal plane; and
    an inner corner belt guide rotatably mounted to the base and engaging the opposite outer side of the inner conveyor belt portion at a second point intermediate the ends of the loop, the inner conveyor belt portion bending around the inner corner belt guide to provide a second conveying path for the inner conveyor belt portion in two directions in the generally horizontal plane, whereby the outer and inner conveyor belt portions convey the articles thereon along the respective first and second conveying paths.

2. The apparatus of claim 1 further comprising a motor having a driving element engaging the conveyor belt.

3. The apparatus of claim 2 further comprising a torque limiter connected between the motor and the driving element for limiting the torque applied to the conveyor belt.

4. The apparatus of claim 2 wherein the conveyor belt further includes at least one workpiece support for supporting an article being conveyed by the conveyor belt.

5. The apparatus of claim 6 further comprising:

a sensor for sensing the detectable feature; and a control coupled to the motor and the sensor and commanding the motor to stop the conveyor belt in response to the sensor sensing the detectable feature.

6. The apparatus of claim 4 wherein the motor moves the conveyor belt through an incremental displacement and the conveyor belt has at least one detectable feature identifying a location on the conveyor belt.

7. The apparatus of claim 6 wherein the conveyor belt further comprises a plurality of workpiece supports for supporting respective articles being conveyed by the conveyor belt.

8. The apparatus of claim 7 wherein the motor moves the conveyor belt through an incremental displacement equal to an integer multiple of a distance between two of the work supports.

9. The apparatus of claim 8 wherein the detectable feature is an element of the workpiece support.

10. An apparatus for conveying articles in at least two directions in a generally horizontal plane comprising:

first and second base sections, the position of the first base section being adjustable with respect to the position of the second base section;

a flexible flat conveyor belt formed in a continuous closed loop for supporting articles to be conveyed, the conveyor belt having an inner side facing an interior of the closed loop and having an opposite outer flat side facing away from the interior of the closed loop, the conveyor belt being mounted with the inner and outer surfaces being disposed vertically;

a first belt guide rotatably mounted to the first base section and engaging the inner side of the conveyor belt at one end of the loop;

a second belt guide rotatably mounted to the first base section and engaging the inner side of the conveyor belt at an opposite end of the loop, the loop being formed by inner and outer conveyor belt portions moving in opposite directions with respect to each other;

an inner corner belt guide rotatably mounted to the first base section and engaging the opposite outer side of the inner conveyor belt portion at a point intermediate the ends of the loop, the inner conveyor belt portion bending around the inner corner belt guide to direct the inner conveyor belt portion in two directions in a generally horizontal plane; and an outer corner belt guide rotatably mounted to the second base section and engaging the inner side of the outer conveyor belt portion at a point intermediate the ends of the loop, the outer conveyor belt portion bending around the outer corner belt guide to direct the outer conveyor belt portion in two directions in a generally horizontal plane, the position of the second base section being adjustable with respect to the position of the first base section to adjust the tension on the conveyor belt.

11. The apparatus of claim 10 wherein further comprising a tensioning device mechanically connected to both the first and second base sections for adjusting the relative positions of the first and second base sections and the tension on the conveyor belt.

12. The apparatus of claim 11 wherein the tensioning device is a jack screw threadedly coupled to both the first and second base sections for adjusting the relative positions of the first and second base sections and the tension on the conveyor belt.

* * * * *

UNITED STATES PATENT AND TRADEMARK OFFICE
CERTIFICATE OF CORRECTION

PATENT NO. : 6,044,964

DATED : April 4, 2000

INVENTOR(S) : Krupa, Jr., et al.

It is certified that error appears in the above-identified patent and that said Letters Patent is hereby corrected as shown below:

Column 4, line 4 reads "pieces form the first" and should read –pieces from the first–.

Column 9, line 7 reads "a more efficient and economical processes" and should read –more efficient and economical processes–.

Column 9, line 26 reads "dampen mechanically noise" and should read –dampen mechanical noise–.

Column 9, line 67 reads "inner comer" and should read –inner corner–.

Claim 10, line 21 reads "inner comer" and should read –inner corner–.

UNITED STATES PATENT AND TRADEMARK OFFICE
CERTIFICATE OF CORRECTION

PATENT NO. : 6,044,964

DATED : April 4, 2000

INVENTOR(S) : Krupa, Jr., et al.

It is certified that error appears in the above-identified patent and that said Letters Patent is hereby corrected as shown below:

Claim 10, line 32 reads "outer comer" and should read -- outer corner --.

Signed and Sealed this

Eighth Day of May, 2001

*Attest:*

*Attesting Officer*

NICHOLAS P. GODICI

*Acting Director of the United States Patent and Trademark Office*